US010662718B2

(12) United States Patent
Gupta et al.

(10) Patent No.: US 10,662,718 B2
(45) Date of Patent: May 26, 2020

(54) DRILLING RIG STAIR TOWER WITH INTEGRATED UTILITY LINES AND CABLE TRAY

(71) Applicant: Nabors Drilling Technologies USA, Inc., Houston, TX (US)

(72) Inventors: Ashish Gupta, Houston, TX (US); Derek Patterson, Houston, TX (US); Ryan Hause, Houston, TX (US); Padira Reddy, Richmond, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 0 days.

(21) Appl. No.: 15/624,333

(22) Filed: Jun. 15, 2017

(65) Prior Publication Data

US 2017/0362901 A1      Dec. 21, 2017

Related U.S. Application Data

(60) Provisional application No. 62/351,079, filed on Jun. 16, 2016.

(51) Int. Cl.
*E21B 15/00* (2006.01)
*E04F 11/04* (2006.01)
*F16L 3/26* (2006.01)

(52) U.S. Cl.
CPC .............. *E21B 15/00* (2013.01); *E04F 11/04* (2013.01); *F16L 3/26* (2013.01)

(58) Field of Classification Search
CPC .............. E21B 15/00; F16L 3/26; E04F 11/04
See application file for complete search history.

(56) References Cited

U.S. PATENT DOCUMENTS

| 3,020,972 | A | * | 2/1962 | Hockett | B62B 3/00 |
| | | | | | 182/120 |
| 3,556,248 | A | * | 1/1971 | Brown | B62B 3/00 |
| | | | | | 182/15 |
| 3,789,955 | A | * | 2/1974 | Knapp | E04F 11/04 |
| | | | | | 182/78 |
| 3,997,024 | A | * | 12/1976 | Fredricks | E04G 1/20 |
| | | | | | 182/119 |
| 8,302,736 | B1 | * | 11/2012 | Olivier | E21B 15/00 |
| | | | | | 166/379 |
| 8,371,077 | B2 | * | 2/2013 | Delhomme | E04F 11/04 |
| | | | | | 182/93 |
| 8,393,416 | B2 | * | 3/2013 | Beck | E21B 15/02 |
| | | | | | 175/162 |
| 9,109,399 | B2 | * | 8/2015 | Murr | E21B 7/02 |
| 9,151,412 | B2 | * | 10/2015 | Trevithick | E21B 15/00 |
| 9,458,675 | B2 | * | 10/2016 | Konduc | E21B 15/00 |
| 9,617,796 | B2 | * | 4/2017 | Hall | E21B 15/003 |
| 9,708,861 | B2 | * | 7/2017 | Reddy | E21B 15/003 |

(Continued)

FOREIGN PATENT DOCUMENTS

EP          79476 A  *  3/1983
FR       2477609 A2 *  9/1981

*Primary Examiner* — Adriana Figueroa
(74) *Attorney, Agent, or Firm* — Adolph Locklar

(57) ABSTRACT

A stair tower for a drilling rig is disclosed, the stair tower including a frame, one or more stair flights and platforms positioned within and mechanically coupled to the frame, and a cable tray pivotably coupled to the frame.

21 Claims, 4 Drawing Sheets

(56) References Cited

U.S. PATENT DOCUMENTS

| | | | |
|---|---|---|---|
| 2012/0318530 A1* | 12/2012 | Wollum | E21B 15/00 166/379 |
| 2014/0224944 A1* | 8/2014 | Royer | E21B 15/00 248/70 |
| 2016/0130877 A1* | 5/2016 | Fortson | E21B 7/023 52/121 |
| 2016/0168929 A1* | 6/2016 | Magnuson | E21B 19/14 166/379 |

* cited by examiner

DRILLING RIG STAIR TOWER WITH INTEGRATED UTILITY LINES AND CABLE TRAY

CROSS-REFERENCE TO RELATED APPLICATIONS

This application is a nonprovisional application that claims priority from U.S. provisional application No. 62/351,079, filed Jun. 16, 2016.

TECHNICAL FIELD/FIELD OF THE DISCLOSURE

Land-based drilling rigs may be configured to be traveled from location to location to drill multiple wells within the same area known as a wellsite. Additionally, when initially rigged up, multiple electrical and fluid connections must be connected between various parts of the drilling rig and other wellsite components. Traditionally, electrical cables and utility piping are brought to the rig floor by one or more grasshoppers and vertical cable trays. Each grasshopper and vertical cable tray must be transported and rigged up and down separately, typically requiring at least one crane lift.

SUMMARY

In certain embodiments, the disclosure is directed to a stair tower for a drilling rig, the stair tower including a frame, one or more stair flights and platforms positioned within and mechanically coupled to the frame, and a cable tray pivotably coupled to the frame.

In other embodiments, the disclosure is directed to a system. The system includes a drilling rig, the drilling rig including a drill rig floor. The system also includes a stair tower mechanically coupled to the drilling rig, the stair tower including a frame, one or more stair flights and platforms positioned within and mechanically coupled to the frame, and a cable tray pivotably coupled to the frame. The cable tray has one or more of electrical cables or utility piping running on or through the cable tray from the frame to a distal end of the cable tray, and the cable tray is pivoted to a raised position. The one or more of electrical cables or utility piping are mechanically coupled to one or more corresponding electrical cables or utility piping of the drilling rig positioned at or near the distal end of the cable tray.

In yet other embodiments, the disclosure is directed to a method. The method includes providing a drilling rig, and transporting a stair tower to the drilling rig in a horizontal position. The stair tower includes a frame, one or more stair flights and platforms positioned within and mechanically coupled to the frame, and a cable tray pivotably coupled to the frame. The cable tray has one or more of electrical cables or utility piping running on or through the cable tray from the frame to a distal end of the cable tray. The cable tray is pivoted to a raised position. The one or more of electrical cables or utility piping are mechanically coupled to one or more corresponding electrical cables or utility piping of the drilling rig positioned at or near the distal end of the cable tray. The method also includes raising the stair tower from the horizontal position to a vertical position and mechanically coupling the stair tower to the drilling rig. The method includes extending the cable tray and mechanically coupling the one or more of electrical cables or utility piping to one or more of corresponding electrical cables or utility piping of the drilling rig.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
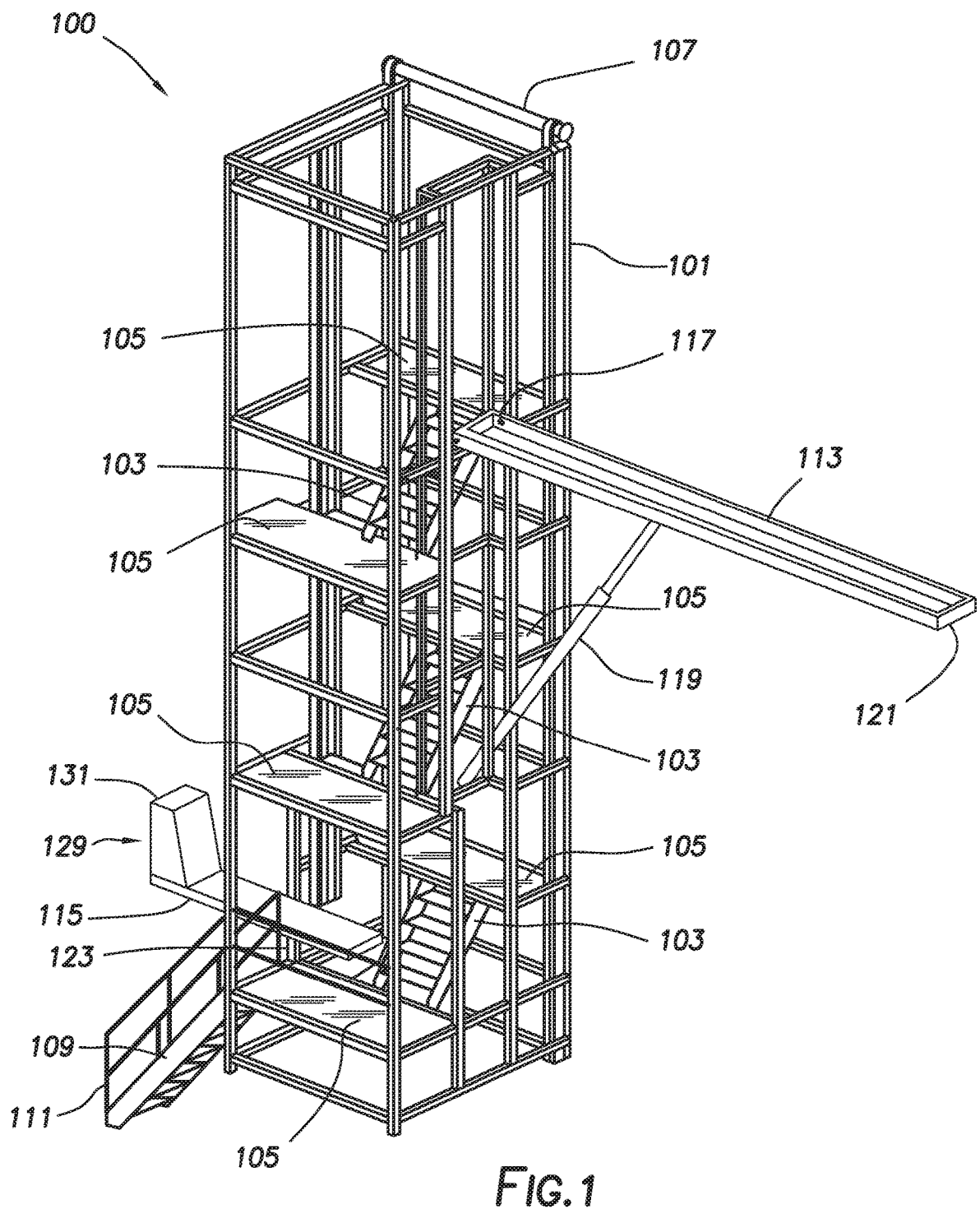
FIG. 1 is a perspective view of a stair tower in accordance with certain embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
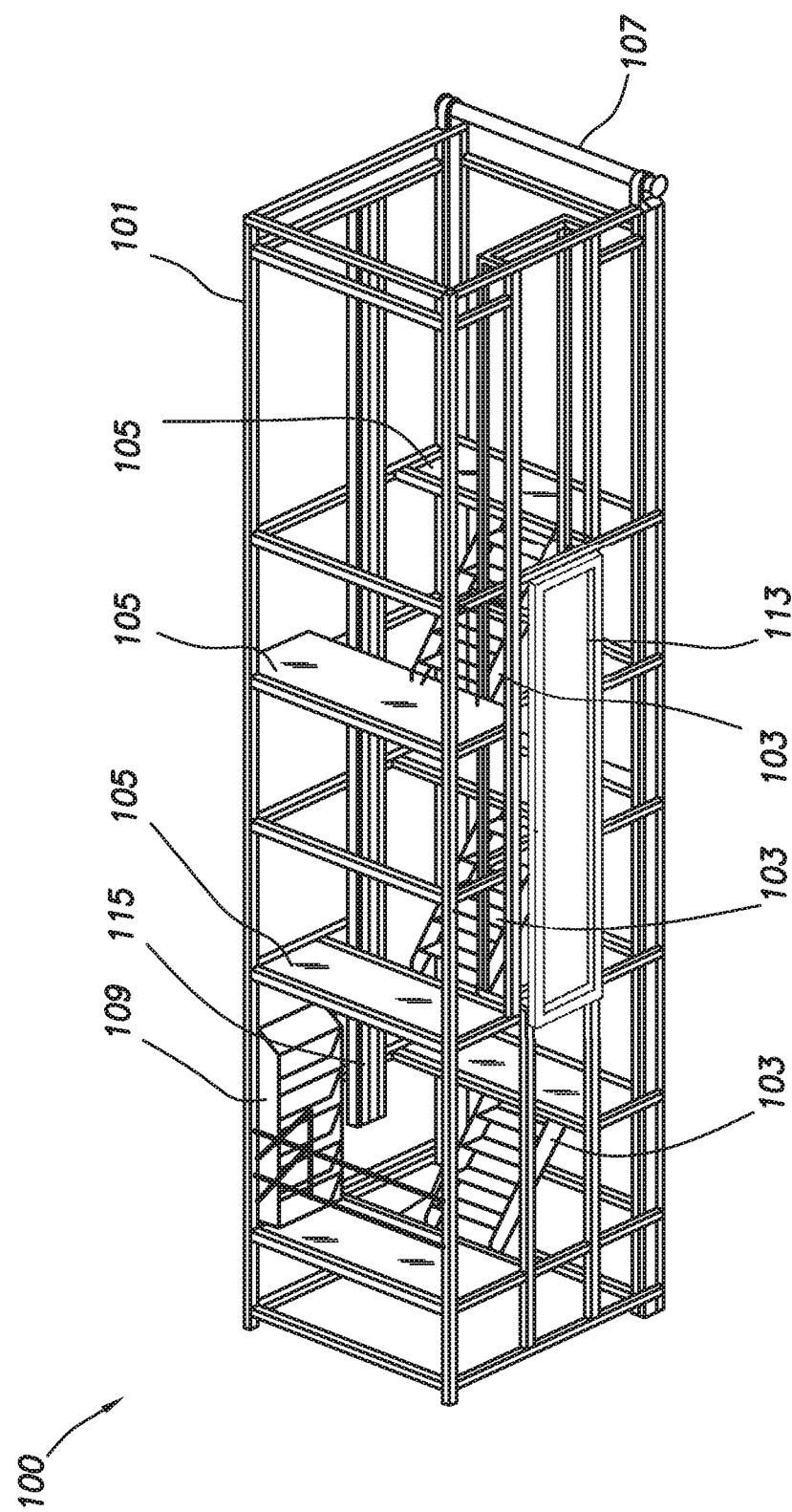
FIG. 2 is a perspective view of a stair tower in accordance with certain embodiments of the present disclosure.
Figure 3:
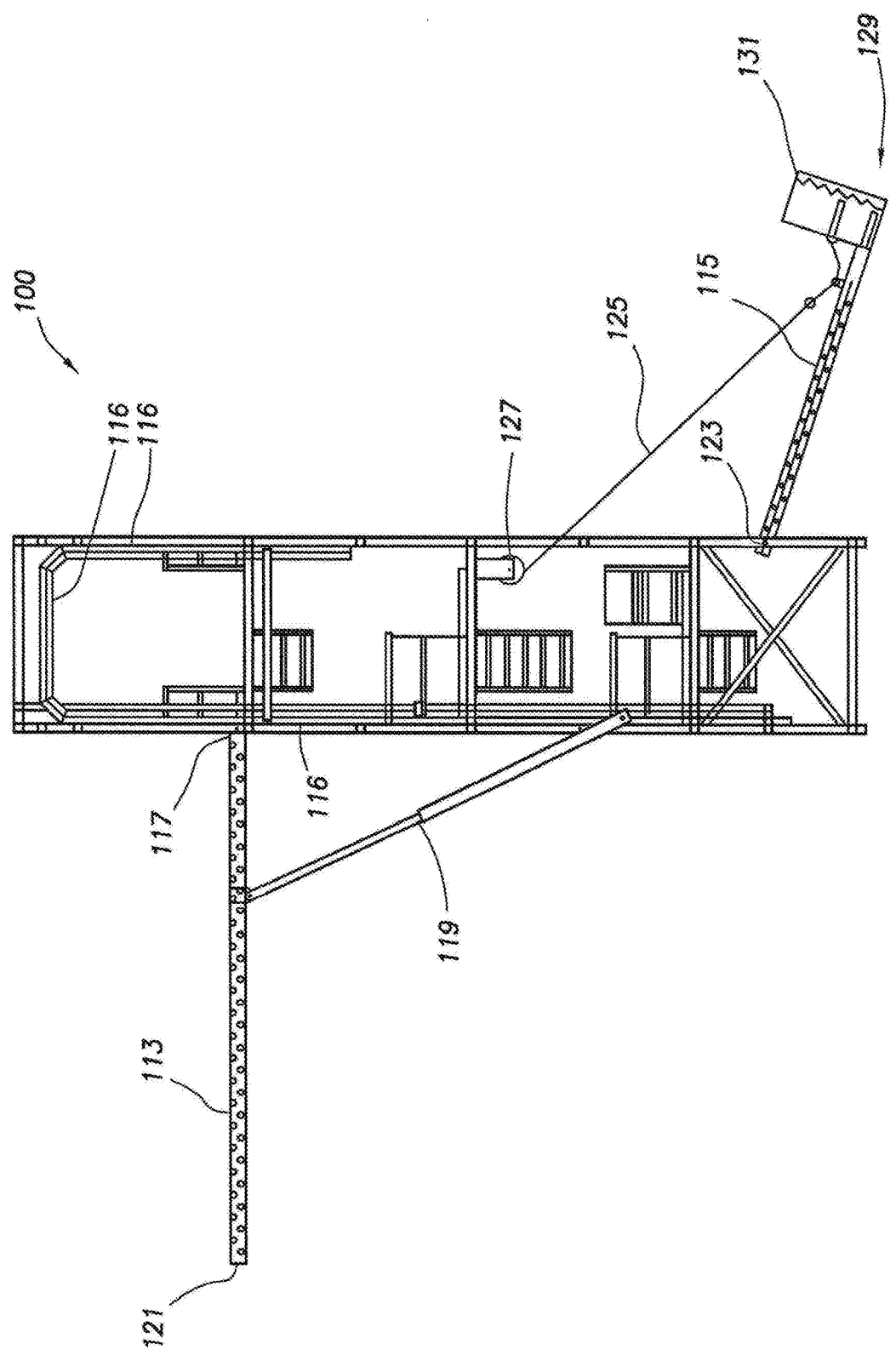
FIG. 3 is a perspective view of a stair tower in accordance with certain embodiments of the present disclosure.

FIGS. 1-3 depict stair tower 100 consistent with at least one embodiment of the present disclosure. In some embodiments, stair tower 100 may include frame 101. Frame 101 may be formed in the shape of a generally rectangular prism. In some embodiments, frame 101 may be a resilient frame. In some embodiments, frame 101 may be utilized to support one or more stair flights 103 and platforms 105 positioned within and mechanically coupled to frame 101. In some embodiments, stair flights 103 and platforms 105 may be adapted such that when stair tower 100 is mechanically coupled to a drilling rig, as further discussed herein below, a user may alight upon a drill rig floor from the ground level. In some embodiments, frame 101 may be utilized to transport stair tower 100 by, for example and without limitation, a winch truck. In some embodiments, frame 101 may be sized such that it is transportable by a single winch truck.

In some embodiments, frame 101 may be sized such that it complies with one or more transportation regulations. For example and without limitation, in some embodiments, frame 101 may be formed such that it is at most 8'6" wide and 9'6" in depth, such that when transported in a horizontal position, stair tower 100 is a non-permit load. In some embodiments, frame 101 may include tail rolls 107. Tail rolls 107 may be one or more bars or other mounting points for allowing stair tower 100 to be loaded onto a winch truck.

In some embodiments, stair tower 100 may include lower stair assembly 109. Lower stair assembly may be mechanically coupled to frame 101. In some embodiments, lower stair assembly 109 may provide access between a lowermost platform 105 to the ground, allowing a user to alight upon the lowermost platform 105 from the ground. Lower stair assembly 109 may, in some embodiments, be pivotably moved from a lowered position as depicted in FIG. 1 to a raised position, as depicted in FIG. 2. In some such embodiments, when in the raised position, lower stair assembly 109 may be positioned within the metes of frame 101. In some such embodiments, lower stair assembly 109 may be within the previously discussed dimensions of frame 101, and may not substantially protrude from frame 101. In some embodiments, lower handrails 111 may be mechanically coupled to lower stair assembly 109. In some embodiments, lower handrails 111 may be pivotably coupled to lower stair assembly 109 such that when lower stair assembly 109 is in the raised position, lower handrails 111 pivotably collapse to allow lower stair assembly 109 to pivot into the raised position. In some embodiments, lower handrails 111 may be removable from lower stair assembly 109.

In some embodiments, stair tower 100 may include one or more cable trays. One or more cable trays may be pivotably coupled to frame 101 and may be moved from a retracted position to an extended position. For example and without limitation, in some embodiments, as depicted in FIG. 3, stair tower 100 may include upper cable tray 113 and lower cable tray 115. Upper cable tray 113 and lower cable tray 115 may be pivotably coupled to frame 101. In some embodiments, stair tower 100 may include one or more fixed cable trays 116 mechanically coupled to frame 101.

In some embodiments, upper cable tray 113 may be mechanically coupled to frame 101 by upper cable tray pivot 117. In some embodiments, upper cable tray 113 may be pivotably moved from an extended position, referred to herein as a raised position, as depicted in FIG. 3 to a retracted position, referred to herein as a lowered position, as depicted in FIG. 2. In some such embodiments, when in the lowered position, upper cable tray 113 may be positioned within the metes of frame 101. In some such embodiments, upper cable tray 113 may be within the previously discussed dimensions of frame 101, and may not substantially protrude from frame 101.

In some embodiments, one or more hydraulic cylinders 119 may couple between upper cable tray 113 and frame 101 to, for example and without limitation, provide motive power to move upper cable tray 113 between the raised position as depicted in FIG. 3 and the lowered position as depicted in FIG. 2.

In some embodiments, upper cable tray 113 may act as a conduit for one or more electrical cables and utility piping. As used herein, utility piping may include, for example and without limitation, one or more lines of either pipe or hose which provide fluid to or from one location to another. Utility piping may include, for example and without limitation, one or more air hoses, water hoses, steam hoses, mud hoses, or hoses or pipes for other fluid. The electrical cables and utility piping may extend through or on upper cable tray 113 from frame 101 to distal end 121 of upper cable tray 113. In some embodiments, as discussed further herein below, distal end 121 of upper cable tray 113 may be located at or near connection points of a drilling rig for the electrical cables and utility piping carried by upper cable tray 113.

In some embodiments, lower cable tray 115, as depicted in FIG. 3, may be mechanically coupled to frame 101 by lower cable tray pivot 123. In some embodiments, lower cable tray 115 may be pivotably moved from a retracted position, referred to herein as a lowered position, as depicted in FIG. 3 to an extended position, referred to herein as a raised position, as depicted in FIG. 2. In some such embodiments, when in the raised position, lower cable tray 115 may be positioned within the metes of frame 101. In some such embodiments, lower cable tray 115 may be within the previously discussed dimensions of frame 101, and may not substantially protrude from frame 101.

In some embodiments, one or more hoisting lines 125 may couple between lower cable tray 115 and frame 101. In some embodiments, hoisting lines 125 may be mechanically coupled to one or more corresponding winches 127 to, for example and without limitation, provide motive power to move lower cable tray 115 between the lowered position as depicted in FIG. 3 and the raised position as depicted in FIG. 2.

In some embodiments, lower cable tray 115 may act as a conduit for one or more electrical cables and utility piping. The electrical cables and utility piping may extend through or on lower cable tray 115 from frame 101 to distal end 129 of lower cable tray 115. In some embodiments, as discussed further herein below, distal end 129 of lower cable tray 115 may be located at or near connection points of a drilling rig or festoon of a wellsite for the electrical cables and utility piping carried by upper cable tray 113.

In some embodiments, distal end 129 of lower cable tray 115 may include plug panel 131 as depicted in FIG. 3. In some such embodiments, one or more of the electrical cables and utility piping extending through or on lower cable tray 115 may terminate at plug panel 131. Plug panel 131 may, for example and without limitation, include one or more connectors corresponding with the electrical cables and utility piping extending through or on lower cable tray 115. In some embodiments, plug panel 131 may allow for the coupling of one or more electrical cables and utility piping of, for example and without limitation, a festoon positioned at a wellsite to the electrical cables and utility piping extending through or on lower cable tray 115 as discussed further herein below.

In some embodiments, the electrical cables and utility piping as previously discussed may extend through frame 101 of stair tower 100. In some embodiments, the electrical cables and utility piping as previously discussed may extend through one or more fixed cable trays 116. For example and without limitation, in some embodiments, one or more electrical cables or utility piping as previously discussed may extend from plug panel 131 of lower cable tray 115 to distal end 121 of upper cable tray 113. In some embodiments, one or more electrical cables or utility piping as previously discussed may, for example and without limitation, extend from one of plug panel 131 of lower cable tray 115 or distal end 121 of upper cable tray 113 to one or more pieces of electrical or hydraulic equipment on stair tower 100 such as, for example and without limitation, one or more of hydraulic cylinders 119, winches 127, lights, or other equipment. In some embodiments, one or more electrical cables or utility piping as previously discussed may, for example and without limitation, extend from one of plug panel 131 of lower cable tray 115 or distal end 121 of upper cable tray 113 to one or more connection points positioned on frame 101 to, for example and without limitation, allow the electrical cables and utility piping to be connected to outside electrical cables or utility piping.

Figure 4:
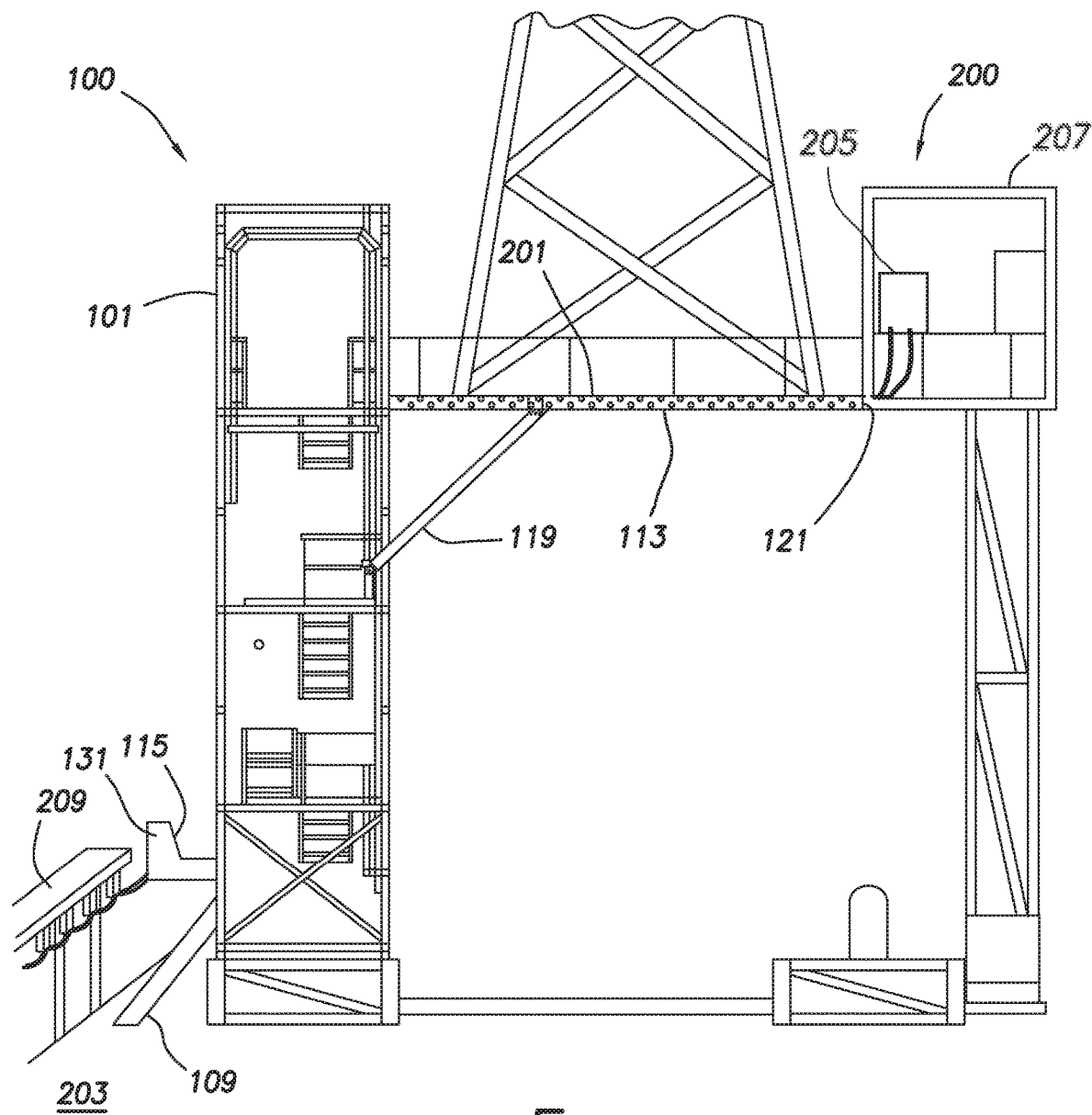
FIG. 4 is a view of a stair tower attached to a drilling rig in accordance with certain embodiments of the present disclosure.

In some embodiments, as depicted in FIG. 4, stair tower 100 may mechanically couple to drilling rig 200. In some such embodiments, stair tower 100 may be transported in a horizontal position as depicted in FIG. 2 and may, when installed to drilling rig 200, be lifted to a vertical position as depicted in FIG. 4. In some embodiments, stair tower 100 may be lifted into the vertical position and mechanically coupled to drilling rig 200 with a single crane lift. In some embodiments, once stair tower 100 is mechanically coupled to drilling rig 200, stair flights 103 may allow a user to alight from stair tower 100 to drill floor 201 of drilling rig 200. In some embodiments, once stair tower 100 is mechanically coupled to drilling rig 200, lower stair assembly 109 may be moved from the raised position to the lowered position. Lower stair assembly 109 may, as previously discussed, allow a user to alight from the ground 203 to stair tower 100.

In some embodiments, once stair tower 100 is mechanically coupled to drilling rig 200, upper cable tray 113 may be moved from the lowered position to the raised position. In some embodiments, one or more hydraulic connections may be made to stair tower 100 to provide hydraulic power to hydraulic cylinders 119 to raise upper cable tray 113. In some embodiments, upper cable tray 113 may be configured such that distal end 121 of upper cable tray 113 may, when upper cable tray 113 is in the raised position, be located at or near one or more electrical cables or utility piping corresponding with the electrical cables and utility piping running through or on upper cable tray 113. In some embodiments, drilling rig 200 may include upper rig plug panel 205 positioned at or near the position of distal end 121 of upper cable tray 113 when upper cable tray 113 is in the raised position. In some such embodiments, once upper cable tray 113 is raised into the raised position, electrical cables and utility piping running through or on upper cable tray 113 may be coupled to upper rig plug panel 205. In some embodiments, upper rig plug panel 205 may be positioned at or near driller's cabin 207 of drilling rig 200.

In some embodiments, once stair tower 100 is mechanically coupled to drilling rig 200, lower cable tray 115 may be moved from the raised position to the lowered position. In some embodiments, one or more hydraulic or electrical connections may be made to stair tower 100 to provide hydraulic or electric power to winches 127 to lower lower cable tray 115. In some embodiments, lower cable tray 115 may be configured such that distal end 129 of lower cable tray 115 may, when lower cable tray 115 is in the lowered position, be located at or near one or more electrical cables or utility piping corresponding with the electrical cables and utility piping running through or on lower cable tray 115. In some embodiments, distal end 129 of lower cable tray 115 may be positioned at or near festoon 209 to, for example and without limitation, allow one or more electrical connections or utility connections between stair tower 100 and festoon 209. In some embodiments, in which distal end 129 of lower cable tray 115 includes plug panel 131, one or more electrical cables or utility piping of festoon 209 may be coupled to plug panel 131 and thus to the corresponding electrical cables or utility piping running on or through lower cable tray 115.

In some embodiments, in order to remove or rig down stair tower 100, electrical cables and utility piping may be disconnected from upper rig plug panel 205 and from plug panel 131. Upper cable tray 113 may be lowered from its raised position to its lowered position with hydraulic cylinders 119. Lower cable tray 115 may be raised from its lowered position to its raised position with winches 127. Lower stair assembly 109 may be raised from its lowered position to its raised position. Stair tower 100 may be mechanically disconnected from drilling rig 200, and moved from its vertical position to its horizontal position utilizing a single crane lift. In some embodiments, stair tower 100 may then be transported utilizing, for example and without limitation, a winch truck The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A stair tower for a drilling rig having a drill rig floor, the stair tower comprising:
   a frame, the frame adapted to be transported separately from the drilling rig, the frame adapted to be coupled to the drilling rig;
   one or more stair flights and platforms positioned within and mechanically coupled to the frame; and
   a cable tray pivotably coupled to the frame, the cable tray pivotable between a vertical retracted position and a horizontal extended position, the cable tray aligned with the drill rig floor when in the extended position, the cable tray configured to be directly coupled to the drill rig floor at a distal end of the cable tray when in the extended position.

2. The stair tower of claim 1, further comprising:
   one or more of electrical cables or utility piping running on or through the cable tray from the frame to the distal end of the cable tray.

3. The stair tower of claim 2, wherein the electrical cables or utility piping comprises one or more of electrical cables, air hoses, water hoses, steam hoses, mud hoses, or hoses or pipes for other fluid.

4. The stair tower of claim 1, wherein the cable tray is pivotably coupled to the frame by a first cable tray pivot.

5. The stair tower of claim 4, further comprising a hydraulic cylinder mechanically coupled between the frame and the cable tray.

6. The stair tower of claim 4, further comprising a winch mechanically coupled to the frame and a hoisting line mechanically coupled between the winch and the cable tray.

7. The stair tower of claim 1, wherein the frame is at most 8'6" wide and 9'6" in depth.

8. The stair tower of claim 7, wherein the cable tray is pivoted to the retracted position, and the cable tray is positioned within the metes of the frame.

9. The stair tower of claim 1, further comprising a second cable tray, the second cable tray pivotably coupled to the frame.

10. The stair tower of claim 1, further comprising a lower stair assembly, the lower stair assembly pivotably coupled to the frame.

11. The stair tower of claim 10, wherein the lower stair assembly is pivoted to a raised position, and the lower stair assembly is positioned within the metes of the frame.

12. A system comprising:
   a drilling rig, the drilling rig including a drill rig floor;
   a stair tower mechanically coupled to the drilling rig, the stair tower including:
      a frame, the frame adapted to be transported separately from the drilling rig, the frame adapted to be coupled to the drilling rig;
      one or more stair flights and platforms positioned within and mechanically coupled to the frame; and
      a cable tray pivotably coupled to the frame, the cable tray having one or more of electrical cables or utility piping running on or through the cable tray from the frame to a distal end of the cable tray, the cable tray pivoted to a raised position, the raised position being horizontal, the cable tray being aligned with the drill rig floor when in the raised position, the distal end of the cable tray directly coupled to the drill rig floor when in the raised position, the one or more of electrical cables or utility piping mechanically coupled to one or more corresponding electrical cables or utility piping of the drilling rig positioned at or near the distal end of the cable tray and on the drill rig floor.

13. The system of claim 12, wherein the electrical cables or utility piping comprises one or more of electrical cables, air hoses, water hoses, steam hoses, mud hoses, or hoses or pipes for other fluid.

14. The system of claim 12, wherein the cable tray is pivotably coupled to the frame at a first cable tray pivot.

15. The system of claim 14, further comprising a hydraulic cylinder mechanically coupled between the frame and the cable tray.

16. The system of claim 14, further comprising a winch mechanically coupled to the frame and a hoisting line mechanically coupled between the winch and the cable tray.

17. The system of claim 12, wherein the frame is at most 8'6" wide and 9'6" in depth.

18. The system of claim 12, further comprising:
a festoon;
a second cable tray, the second cable tray pivotably coupled to the frame;
one or more electrical cables extending through or on the second cable tray from the frame to a distal end of the second cable tray, the distal end of the second cable tray positioned at or near the festoon.

19. The system of claim 12, further comprising a lower stair assembly, the lower stair assembly pivotably coupled to the frame, wherein when the lower stair assembly is pivoted to a raised position, the lower stair assembly is positioned within the metes of the frame.

20. A method comprising:
providing a drilling rig, the drilling rig including a drill rig floor;
transporting a stair tower to the drilling rig in a horizontal position, the stair tower including:
a frame;
one or more stair flights and platforms positioned within and mechanically coupled to the frame; and
a cable tray pivotably coupled to the frame, the cable tray having one or more of electrical cables or utility piping running on or through the cable tray from the frame to a distal end of the cable tray;
raising the stair tower from the horizontal position to a vertical position;
mechanically coupling the stair tower to the drilling rig;
pivoting the cable tray from a vertical position to a raised, horizontal position, the cable tray substantially aligned with the drill rig floor when in the raised position;
coupling the distal end of the cable tray directly to the drill rig floor; and
mechanically coupling the one or more of electrical cables or utility piping to one or more of corresponding electrical cables or utility piping of the drilling rig on the drill rig floor.

21. The method of claim 20, wherein the stair tower further comprises a lower stair assembly pivotably coupled to the frame, and the method further comprises pivoting the lower stair assembly to a raised position, wherein the lower stair assembly is positioned within the metes of the frame.

* * * * *